Feb. 7, 1933.  H. W. FLETCHER  1,896,231
DRILL HEAD AND LUBRICATOR
Filed July 6, 1931
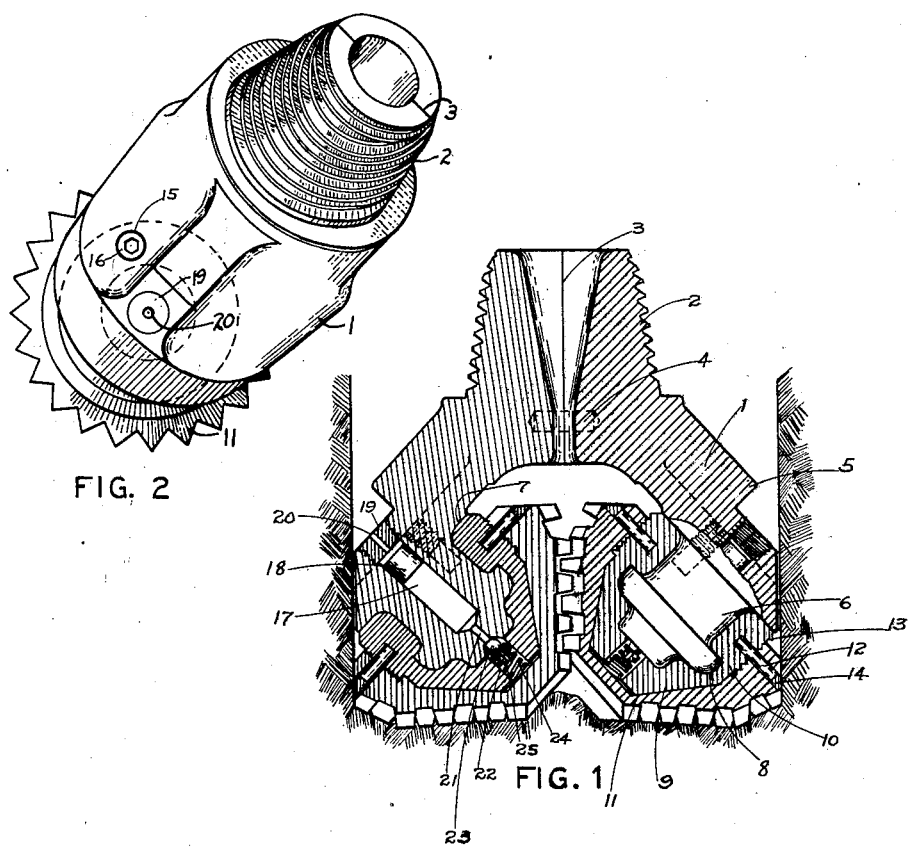
HAROLD W. FLETCHER INVENTOR
BY Jesse R. Stone
ATTORNEY Patented Feb. 7, 1933

1,896,231

UNITED STATES PATENT OFFICE

HAROLD W. FLETCHER, OF HOUSTON, TEXAS, ASSIGNOR TO HUGHES TOOL COMPANY, OF HOUSTON, TEXAS, A CORPORATION OF TEXAS

DRILL HEAD AND LUBRICATOR

Application filed July 6, 1931. Serial No. 548,807.

My invention relates to well drills for use in drilling of deep wells for oil, gas, sulphur, and the like.

It is the object of the invention to provide a head for well drills which is of light and unitary construction, and in which provision is made for lubricating the bearings of the roller cutters by providing a container for the lubricant in the head of the drill.

In previous constructions of drill bits, having roller cutters thereon, a lubricator has been secured to the upper end of the head, and channels have been drilled in the head of the bit to carry the lubricant to the bearings. I contemplate forming a chamber for the lubricant in the head and balancing the fluid pressure on the lubricant in the chamber so that the lubricant may feed to the bearings by gravity.

In the drawing herewith, Fig. 1 is a central vertical section through drill head constructed in accordance with my invention. Fig. 2 is a perspective view in elevation showing my invention.

In the drawing I have shown a drill head 1 which is of light construction. It is made up of two parts which are fitted together along a central line 3 and has a dowel pin 4 interfitting between the two meeting faces of the two sections of the bit. The bit head has an upper threaded shank 2 for connection with the drill collar or a tool joint whereby it may be secured to the drill stem. The head has two downwardly and outwardly inclined legs 5 which are formed with shafts 6 thereon extending downwardly and inwardly at right angles to the flattened faces 7 on the inner sides of the legs 5.

The shafts 6 are preferably formed integral with the legs 5, and serve as bearings for the cutters. Each shaft has a radial flange 8 thereon beyond which the cutter is reduced in diameter at 9.

Mounted on each of the shafts 6 is a bushing 10. This bushing is cast in position, and may be made of softer metal such as bronze, but it is understood that it may be of steel or any other desirable material. It is cast in position about the shaft and within the cutter 11, which is a frusto-conical shaped cutter, the interior of which is formed to surround the end of the shaft 6 and include the bushing 10. Radial pins 12 extending through the cutter are fitted within recesses in the bushing and lock the bushing non-rotatably within the cutter. I form threads 13 on the bushing adjacent the base upon which the cutter may be screwed. The pins 12 are then locked in position by a bond of welding material shown at 14.

In order to hold the bushings stationary when the cutter is screwed off or onto the bushing, an opening 15 is extended through the leg of the bit body and a recess is formed in the end of the bushing to receive a set screw 16 which may be extended through the leg and into the bushing thus holding the bushing non-rotatably relative to the head while the cutter is screwed onto or from the shaft. This pin may be removed and the opening filled with a plug during the operation of the drill.

My invention consists in forming a lubricating chamber shown at 17 in the head of the drill. This recess may be formed in the head at any preferred point, but I have shown it as extending through the side of the leg 5 axially of the shaft 6. It is cylindrical, and a small plug or piston 18 is fitted into the outer end of the chamber after it has been filled with lubricant, and a plug 19 is screwed into the outer end of the recess. Said plug has a central opening 20 to allow fluid from the hole to enter behind the piston 18 to balance the fluid pressure thereon at the outer end. At the inner end of the chamber the channel 21 of reduced diameter is formed extending through the end of the shaft to connect with a chamber 22 in the end of the bushing.

Within the chamber 22 is a valve 23 held in position to close the channel 21 by means of a spring 24 bearing at its inner end against a cap 25 which is recessed to fit against the ball and force it resiliently into its seat. There is an axial passage through the cap allowing lubricant to pass.

In the operation of the drill the cutters are mounted as described, and the lubricator chamber 17 is filled with a heavy lubricant such as is required in the lubrication of the bearings. The piston 18 is assembled on the outer end of the lubricant chamber, and the plug 19 is screwed into position. It will be seen that in the operation of the drill there will be a slight clearance between the bushing and the outer surface of the shaft so that the fluid pressure from the hole will tend to pass in at the base of the bushing to the bearing, and exert a pressure against the lubricant in the chamber 17. This pressure will be balanced by the fluid pressure extending through the opening 20 in the plug 19. Lubricant will, therefore, feed down by gravity to the bearings. There will also be a slight pumping effect upon the lubricant due to the rotation of the bushing upon the shaft. It is found that wear takes place on the lower side of the shaft most rapidly, and the cutter has a very slight wabbling effect which moves the ball valve to and from its seat with a very slight reciprocating action which helps move the lubricant downwardly to the bearings. The plunger 18 follows down behind the lubricant as it is fed to the bearing surfaces.

The drill structure thus described is of light and economical construction, and when the cutters have been worn out, the drill may be discarded without the necessity of attempting to remove the cutters or the bearings. By forming the lubricator in the head of the drill in this manner, satisfactory lubrication may be obtained at an economical cost so that in discarding the head of the bit when the cutters are worn, no appreciable waste of material results.

Having thus described my invention, what I claim as new is:

A roller well drill including a head, cutter shafts thereon, cutters on said shafts, a lubricant chamber axially of each shaft, a channel connecting each chamber with the bearing surface of the shaft, means to equalize fluid pressure in said chamber, including a plug closing said chamber and having a small opening therethrough to admit fluid pressure from the well, and a valve in said channel at the end of said shaft.

In testimony whereof, I hereunto affix my signature this the 29th day of June, A. D., 1931.

HAROLD W. FLETCHER.